Oct. 26, 1937.  H. KARL  2,097,329
BRAKE MECHANISM FOR MOTOR VEHICLES
Filed Oct. 29, 1932  2 Sheets-Sheet 1
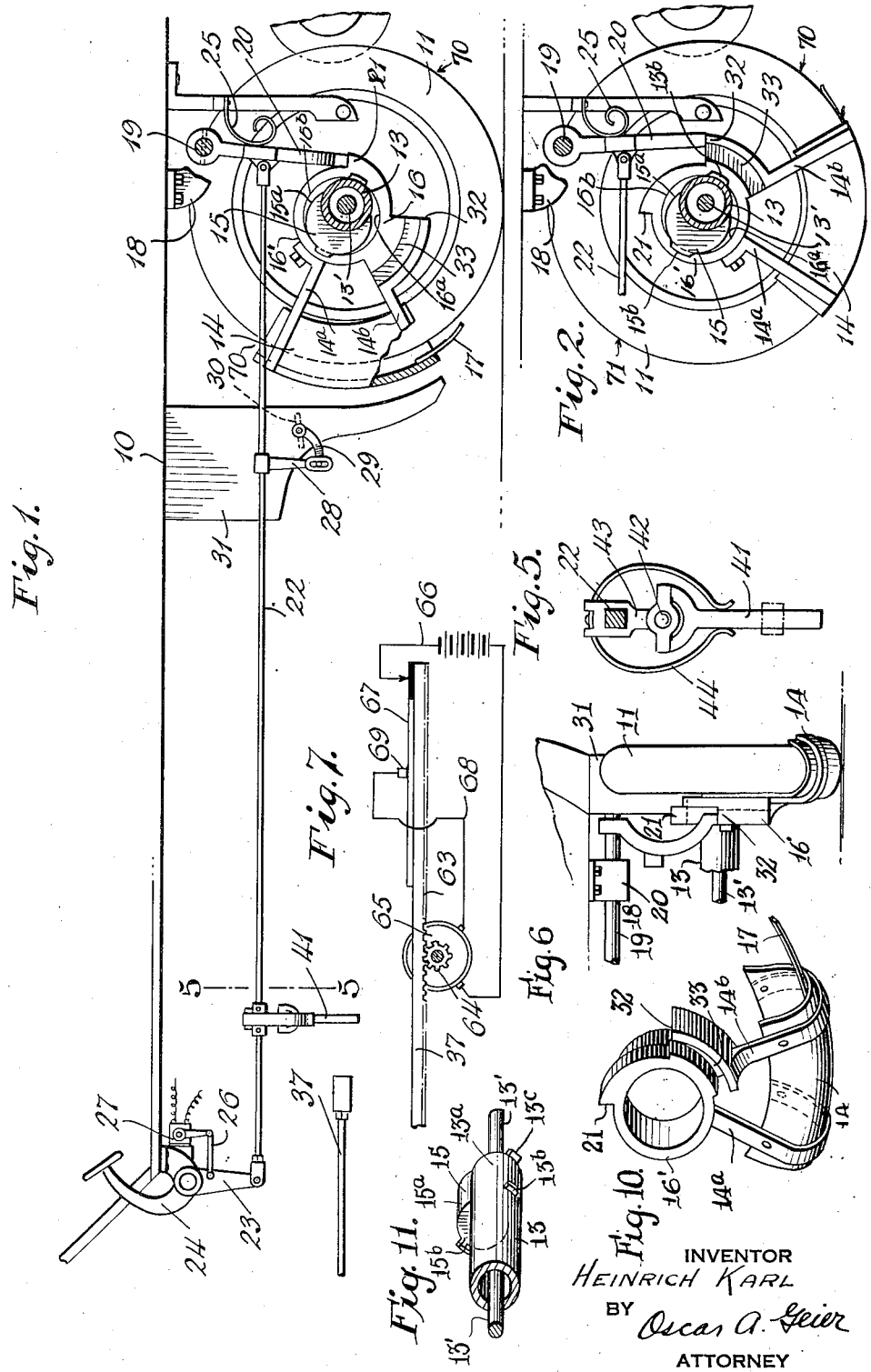
INVENTOR
HEINRICH KARL
BY Oscar A. Geier
ATTORNEY

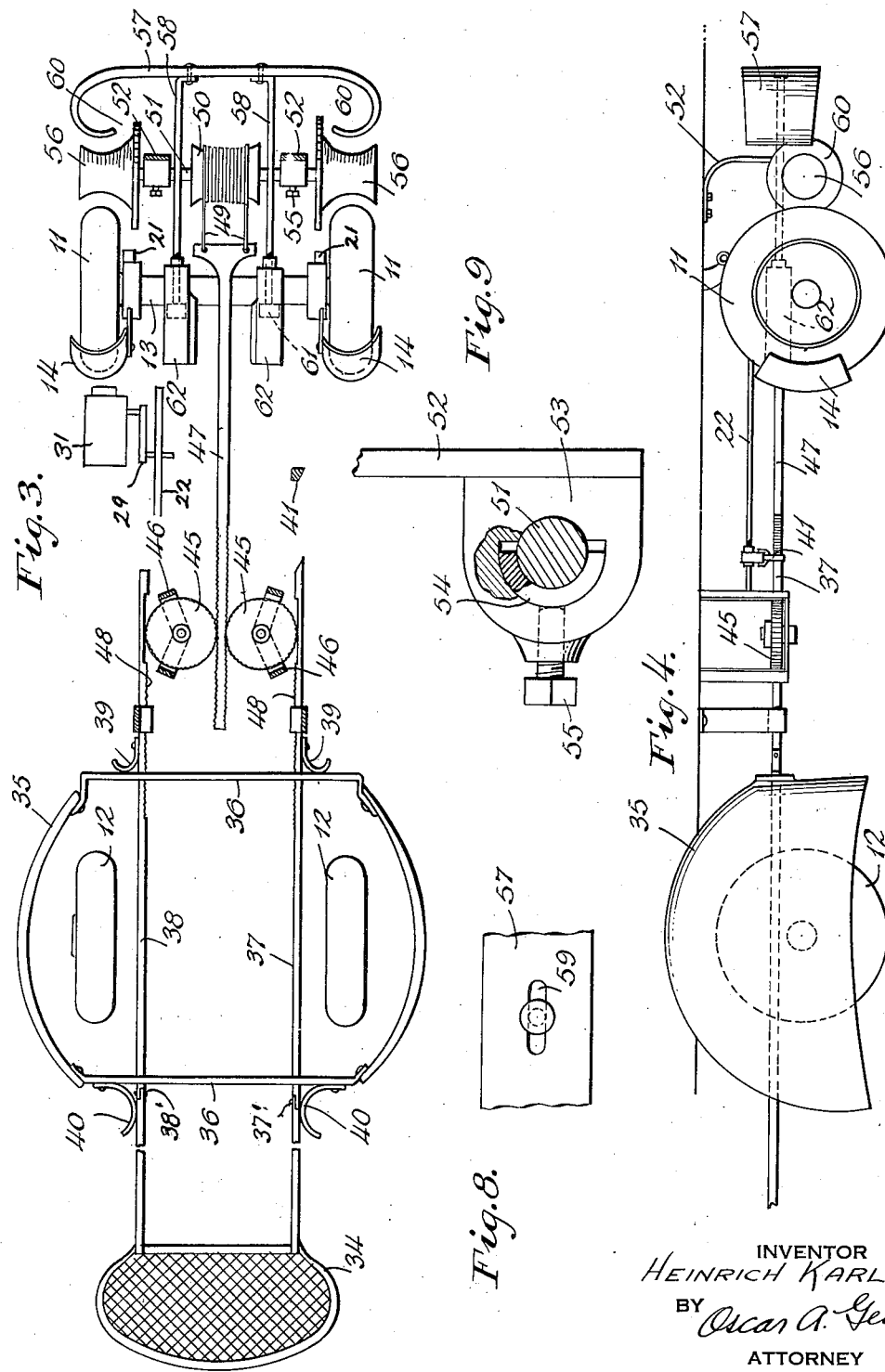

Patented Oct. 26, 1937

2,097,329

UNITED STATES PATENT OFFICE 2,097,329

BRAKE MECHANISM FOR MOTOR VEHICLES

Heinrich Karl, Jersey City, N. J.

Application October 29, 1932, Serial No. 640,183

13 Claims. (Cl. 188—4)

This invention relates to improvements in motor vehicles and has particular reference to a brake mechanism therefor.

An object of the invention is to provide an improved method for effectively braking a motor vehicle so that it may be brought to practically an instantaneous stop and to so construct such mechanism that it may be manually controlled by the operator of the vehicle or actuated by parts of said vehicle coming in contact with an obstruction in its path.

These objects are in part accomplished by providing a brake mechanism wherein an eccentrically mounted shoe associated with each of the rear wheels of the vehicle is normally held in inoperative position by a latching device which, when actuated, will permit said shoe to move by gravity to its operative position and retain it beneath the associated wheel in such frictional contact therewith as to permit the wheel to rotate relative thereto, said latching device being operated, subsequent to the braking operation, to release said shoe in order that it might be restored to its normal position by the rotation of the wheel which is in contact therewith.

It is, however, not necessary to stop the vehicle for permitting the restoration of the braking shoe to inoperative position, but the simple lifting of the foot from a pedal will render the brake-shoe ineffective while the vehicle may be still moving or while it may stand still. This is especially important under present-day traffic conditions which do not permit the vehicle to stop every time or even to move backwards just for allowing the placing of the braking device into non-operative position as is suggested in other disclosures in which brake-shoes are employed.

The reasons for employing said shoe as the braking means are manifold. It prevents the tire of the wheel from wearing out as rapidly as with the ordinary braking devices because the tire will not slide on the ground. It is especially adapted to brake the vehicle safely in conjunction with a sanding device and it prevents skidding of the wheels when the road is slippery from rain, snow, ice, sleet, etc. It is adapted to prevent overturning of the vehicle when the same is brought to a sudden stop after traveling at high speed, because of the fact that the wheels are allowed to continue turning. Furthermore, the particular design of the brake shoe avoids the gripping of the tires which consequently will not be damaged thereby. Also, automatically acting and self-restoring fenders and bumper elements are so designed as to cooperate with said brake shoe as to largely absorb the heavier shocks that take place during collisions of all sorts and serve for the complete protection of the vehicle and its occupants. And lastly, the fender and bumper elements cooperate with said brake shoe when a major collision takes place while other means are employed for obtaining a slight braking action when there is only a minor collision such as might occur at a comparatively low speed of the vehicle.

The above and other objects will appear more clearly from the following description when taken in connection with the accompanying drawings which illustrate preferred embodiments of the invention idea.

In the drawings:—

Figure 1 is a fragmentary longitudinal section through the rear portion of a motor vehicle showing the brake mechanism associated with one of the rear wheels of said vehicle, said mechanism being in its normal position.

Figure 2 is a view similar to Figure 1 showing a brake shoe in its operative position.

Figure 3 is a fragmentary plan view showing the apparatus for controlling the restoration of the bumper and fender elements to their normal positions.

Figure 4 is a side elevation of the mechanism shown in Figure 3.

Figure 5 is a section taken on the line 5—5 of Figure 1 showing in elevation a contact arm which is operated to accomplish the automatic operation of the brake mechanism.

Figure 6 is an elevation (rear view) of one of the brake shoes being in braking position, one of the latching arms being also shown associated with the brake mechanism and operable to releasably retain the brake shoe in its inoperative and operative positions.

Figure 7 is a diagrammatic view of a modification showing electrical means associated with the brake mechanism and utilized to control the restoration of bumper or fender elements to their normal positions after striking an obstruction.

Figure 8 is an elevation of a detail, and

Figure 9 is a sectional view of another detail.

Figure 10 is a perspective view of the hub portion also shown in Figures 1 and 2, that comprises a ring shaped part with shoulder and a channeled part also having a shoulder; the brake shoe is also shown being held by braces that are secured to the hub portion.

Figure 11 is a perspective and sectional view of a fraction of the rear axle and of the axle housing of an automobile according to Figures 1 and 2, showing also the saddle-like eccentrically arranged projection that is rigidly secured to the axle housing and upon which the hub portion shown in Figure 10 is mounted for revolving around the respective part of the axle housing and the eccentrically arranged projection.

Referring more particularly to the Figures 1 to 6 the numeral 10 indicates conventionally the chassis of a motor vehicle having the front and rear wheels 11 and 12 respectively, the rear wheels being connected by the usual axle 13' which is conventionally surrounded by the protecting and stable axle housing 13. Associated with each of the rear wheels 11 is a brake shoe 14 which is adapted to be held in a normally inoperative position, as shown in Figure 1, and released from said position so that said shoe will move rotatively relative to the axle 13' to the operative position shown in Figure 2 in which it will engage the ground or supporting surface and elevate the associated wheel above the latter. The brake shoe is made of sole leather, a thin metal sheet or tough artificial fabric of uniform thickness and is bent to conform substantially to the contour of the vehicle wheel. In its normal position the ground engaging portion of the shoe 14 is spaced from the tire of the wheel 11 and as it moves towards its operative position said shoe is gradually brought closer to said tire by the ground until, in the operative position of the shoe, there is frictional contact between the tire and the shoe due to the weight of the vehicle resting on that shoe, which will permit of a relative movement of the tire and at the same time be sufficient, when the wheel is rotated and the locking (latching) device released, which will be described further, to swing the shoe around in anti-clockwise direction until it again reaches its normal or inoperative position. In order to accomplish the movement of the shoe from its spaced position relative to the tire to its position of frictional contact therewith while said shoe is rotating towards its operative position there is to the axle housing 13 an eccentric or any suitable projection 15 secured, which is therefore stable and about which the hub portion 16 of the shoe revolves, the eccentric being so arranged as to draw the ground engaging portion of the shoe inwardly toward the tire when said shoe is released due to the ring of said hub portion that engages with its inner surface 16a, said stable eccentric rotatably. The shoe is provided at its lower edge with an extending plate 17 which engages underneath the tire and the ground as the shoe approaches its operative position so as to assist the swinging of the shoe into said position. Trucks usually have a non-revolvable rear axle especially when the truck is chain driven and in this case, the stable eccentric is directly secured to the axle.

A latching device is utilized to releasably maintain the brake shoes in both the inoperative and operative positions thereof and is supported beneath the chassis 10 by a hanger 18 in which is mounted a rocker shaft 19 extending a certain distance between the wheels 11. Adjacent each end of the shaft 19 carries a latching arm 20, 25a is a stop that prevents the arm 20 from moving too far backwards, curved as indicated in Figure 6, the lower end of which is adapted to engage a shoulder 21 on the hub portion 16 of the shoe 14 to support the latter in its inoperative position. An operating rod 22 has its rear end connected to one of the arms 20 and its forward end is joined by a link 23 to the foot brake pedal 24 situated in the usual position adjacent the driver's seat. A manual operation of the brake mechanism is accomplished by depressing the pedal 24 to thereby push the rod 22 rearwardly against the tension of a spring 25 which engages the arm 20. The rearward movement of said rod causes a rocking of the shaft 19 and consequently disengagement of the lower ends of both of the arms 20 from the shoulders 21 of their respective brake shoes. The rearward movement of said rod 22 is also utilized to operate, through the link connection 26, a switch conventionally illustrated at 27 which controls the electric circuit of the vehicle engine whereby no ignition will take place in the cylinders when the switch is in open position due to the depression of the pedal 23. Said rod 22 also carries an arm 28 just forwardly of the rear wheels, said arm having a slotted connection with a lever 29 for controlling the opening and closing of the valve 30 of a hopper 31 which may contain sand for the purpose of deposit on the ground in front of the wheels when the brakes are applied.

The disengagement of the latch arms 20 from the associated shoulders 21 now permits each brake shoe 14 to swing downwardly by gravity until the the plate 17 engages the ground whereupon a slight continued rolling action of the wheel will draw said shoe directly beneath the latter and elevate it slightly above the ground in frictional contact with the ground engaging portion of the shoe. The swinging movement of the shoe to its operative position is limited by the latch arm 20 which, after being forced rearwardly, is disposed in the path of and engages, as shown in Figure 2, a second shoulder 32 formed on the hub 16 of the brake shoe. After the vehicle has been brought to a stop and it is desired to restore the brake shoes to their normal positions, the pedal 24 is released so as to permit the spring 25 to move the arms 20 forwardly until the lower end of each of the arms is aligned with a groove or channel 33 formed in one face of the hub portion 16 of the associated brake shoe. The starting of the engine of the vehicle now drives the rear wheels 11 and through the frictional contact thereof with the brake shoes, the latter will be swung rearwardly in an anti-clockwise direction and when their middle part, and even shortly before, arrives at the point indicated by the arrow as viewed in Figures 1 and 2, the shoes 14 will be pressed against the circumference of the wheels 11 by a mechanism that will be explained subsequently. While this function takes place the lower ends of the arms 29 then pass through the grooves 33, and the curved or offset arms permit adjacent parts of the brake shoe to swing clear of the arms. The impetus imparted to the brake shoes by reason of the frictional contact of the wheels therewith will be sufficient to swing the shoes back to their normal positions at which time the arms 20 will again engage the shoulders 21.

Referring more particularly to details of the hub 16 and associated parts thereto as best seen in Figures 10 and 11 there is a ring-shaped part 16' with a cylindrical inner wall 16a rigidly united therewith. The length or depth of that inner cylindrical wall corresponds with the length of the outer cylindrically rounded wall 15a of the eccentrically arranged projection 15 which is shown in Figure 11. The diameter of the hole formed by said cylindrical inner wall 16a must allow the mounting and free revolving of that hub portion on that projection 15, and corresponding part of the axle housing 13. The greater part of the walls 13 and 15a are not contacted by the cylindrical wall 16a, they form corners at the points where they meet.

There is, therefore, always vacant space left between the greater part of the cylindrical wall 16a and of that of the axle housing part 13 and of the surface 15a.

When the latch arm 20 leaves the shoulder 32 and comes in alignment with the channel 33 the wheel 11 can move forward and thereby lets the shoe cling itself to the wheel tire which action is made possible through the eccentrically arranged stable projection 15 which through its position on the left of the upper half of the axle housing 13 according to the Figures 1, 2 and 11 holds the hub 16 its ring-shaped part 16' respectively, in an eccentric position relative to the center of the wheel axle 13' and consequently the shoe 14 will be drawn thereby to the wheel circumference at the point that is opposite to the eccentrically arranged projection 15 and this point is approximately indicated by 70.

The point on the wheel circumference that is opposite the point 70 is indicated by 71. When the shoe therefore arrives at the point 71 it will be distanced from the wheel tire also due to the eccentric position of the hub portion 16, its ring-shaped part 16', respectively, in relation to the center of the wheel axis 13'; while descending to the inoperative position and while remaining in that portion the shoe 14 is likewise kept away from the tire.

For preventing a sidewise movement of the hub 16 that would dislocate it, there are guards 15b, 13b and 13c arranged.

The hub 16 is composed by two parts namely 16 and the ring-shaped part 16', as already mentioned. Both these parts are rigidly united in a way that the channel 33 is formed between them.

On the side of the part 16' whose outer surface is indicated by 33a, there is still another portion, that although forming also a part of the cylindrical wall 16a is chiefly created for giving a greater hold to that part of the hub 16 that forms the shoulder 32, and it serves also for holding the brace 14a. To the last mentioned part of the hub 16 is suitably secured the brace 14b and both braces are first directed straight in a diverging direction and then are bent in such fashion as to embrace the brake shoe and to permit the latter to lie at times with its inner surface close to the tire of the wheel 11. The shoe 14 may be fastened to the braces by any suggestive means but as it is purposely pointed out that the wheel 11 is to turn freely within the brake shoe also when the latter is in braking position there should not be means protruding from said inner surface at least on such parts that might harm the tire.

It is thus apparent that the shoe 14 is easily dismountable and whenever it should be worn out too much it can be removed and another new one put in place, and since the shoe 14 itself will be of a material that is not so expensive as the tire of the vehicle there is also an advantage from the economical view point.

Automatic means for accomplishing the operation of additional brake mechanism is shown in Figures 3 and 4. This means comprises a front bumper 34 disposed in advance of the front wheels 12 and arranged to contact any obstacle in the path of the vehicle. Side fenders 35 connected by bars 36 are supported in any suitable manner in operative position relative to the wheels 12 so as to strike any obstruction on either side of the vehicle, and both the fenders 35 and the bumper 34 are adapted to be moved rearwardly, under the influence of impact thereof with any obstruction. The bumper 34 carries rearwardly extending rods 37 and 38 which pass through the bars 36 and carry springs 39 which engage the rear bar 36 so that when either fender 35 hits an obstruction a rearward movement will be imparted to said rods 37, 38. These rods are divided into sections pivotally connected at 37', 38', so that the bumper 34 can be swung upwardly, if necessary, when the vehicle is stored in a garage. Springs 40 carried by the front bar 36 engage the last-named rods so as to aid in normally centering the fenders 35 with respect to said rods. Disposed in the path of the rearward movement of the rod 37 is an arm 41 (Figure 5) pivoted at 42 to a bracket 43 mounted upon the operating rod 22 adjacent its forward end, said pivot permitting of a sidewise or lateral movement of the arm 41 against the tension of the bowed spring 44 which engages on both sides of said arm. The lower end of the rod 41 and the rear end of the rod 37 are bevelled, as best indicated in Figure 3, so that when said rod strikes the arm the initial impact will move the latter, and consequently the rod 22, rearwardly so as to effect the release of the latch arms 20 of the brake mechanism. By reason of the bevelled surfaces just mentioned the arm 41, after being moved rearwardly, will be swung about its pivot 42 against the tension of the spring 44 so as to be shifted laterally and thereby permit the rod 37 to continue its rearward movement and following the retraction of said rod to its normal position, as will appear later, said spring will restore the arm 42 to its normal vertical position again in the path of the rod.

Means are provided for restoring the rods 37 and 38 and the bumper 34 to their normal positions when the engine is again started after having come to a stop upon the application of the brake mechanism. As shown in Figures 3 and 4 this means comprises a pair of horizontally disposed gears 45 suitably supported in hangers 46 between the rear ends of the rods 37, 38 and having engaged therebetween a rack member 47 adapted for forward and rearward movements between said gears. As the arms 37, 38 are moved rearwardly the rack portions 48 thereof engage the adjacent gears 45 and turn the same so as to exert a forward pull on the member 47. The rear end of said member has flexible elements 49 secured thereto and these elements are wound upon a pulley 50 mounted upon a shaft 51. This shaft is suspended in the lower ends of flexible hangers 52 and in the enlargement 53 (Figure 9) of each hanger through which the shaft 51 passes there is disposed an arcuate brake shoe 54 the pressure of which against the shaft 51 may be regulated by a setscrew 55. The shoes 54 are designed to prevent the too free turning movement of said shaft in its bearings when a forward pull is exerted upon the flexible elements 49 by the movement of the member 47 just described. This pull upon the elements 49 which has a tendency to rotate the drum 50 and consequently the shaft 51 is overcome by the drag upon said shaft created by the shoes 54 and as a consequence the entire shaft is pulled slightly forward, the hangers 52 being sufficiently flexible to permit this movement. When the shaft 51 is thus moved, rollers 56 mounted upon the extremities of said shaft come in contact with the walls 11 and provide braking means therefor in addition to that accomplished by the shoes 14. However, the primary reason of the engagement of the rollers 56 with the walls 11 is to prepare for the restoration of the rods 37, 38 to their normal positions when the wheels 11 are again rotated by the starting of the engine. When this is done as previously described, the wheels 11 will rotate the rollers 56 and consequently the shaft 51, the driving power of said wheels being then sufficient to overcome the braking action of the shoes 54 on said shaft. This rotation of the shaft in a clockwise direction, as viewed in Figure 4, will, through the flexible connections 49, exert a rearward pull upon the rack member 47 thereby turning the gears 45 in the proper direction to cause the rods 37, 38 to be moved forwardly. As this is accomplished the resiliency of the hangers 52 supporting the shaft 51 will become effective to restore said shaft to its normal position.

A rear bumper 57 may be supported, by rods 58, in back of the shaft 51 and said bumper has a slight connection with said rods by means of the slots 59 (see Figure 8) which permit of a slight lateral movement of the bumper if struck at either end thereof, said movement being limited by engagement of the curved ends of the bumper with discs 60 carried by the rollers 56. The forward ends of the rods 58 carry pistons 61 mounted for sliding movement in hydraulic shock absorbers conventionally shown at 62 and mounted upon the axle housing 13.

In Figure 7, electrical means are shown for accomplishing the restoration of the rods 37, 38 and bumper 34 to their normal positions after being actuated to apply the brakes of the vehicle. In this form the rod 37 is provided on its under surface with a rack 63 engaged by a gear 64 mounted upon the shaft of an electric motor 65. The circuit for this motor includes a conductor 66 normally engaged with the insulated end of a contact strip 67 carried by said rod, and a second conductor 68 connected to a terminal 69 which engages the conducting portion of such contact strip 67. Thus it will be seen that when the rod 37 is forced rearwardly the contact at the end of the conductor 66 engaging said insulated portion of the strip 67 will move therefrom into engagement with the conducting portion and a circuit will be closed for the motor 65 so that the same will become effective to rotate the gears 64 in the proper direction to restore the rod 37 to its normal position.

Sometimes minor collisions occur which, when taking place while the vehicle is moving at a low speed, do not necessitate the operation of the brake shoe 14. For this reason the lever 41 is spaced sufficiently from the rod 37 that the latter may be allowed to move backwards a slight distance, which movement might be caused by such a minor collision. In this case the rod 37 would not come into contact with the lever 41, this occurring only when the collision is a heavier one, in which event the rods 37, 38 would be moved backwards for a greater distance. From the foregoing description it is apparent that when only a slight collision (so-called bumps) occurs the rollers 56, 56 which might be made of rubber, will be pressed against the circumference of the wheels 11 and will cause a slight braking action sufficient in this circumstance. The same effect will take place when a side collision towards the front of the side fender 35 occurs or when a collision with the rear bumper 57 takes place. In all these cases the tires 11 form the shock absorbers.

Apparently the rollers 56 when pressing against the wheel 11 seem to form an impedence to the shoes 14 when they move to the inoperative position. The fact, however, that the shoe will be carried to that position only when the wheel 11 moves in the counterclockwise direction according to the view of Figure 1 and view of Figure 2 indicates that the rollers 56 will assist the shoes 14 in moving to the inoperative position because these rollers are then turned in the clockwise direction while they will turn in the counterclockwise direction when the vehicle collides with an obstacle and while the front bumper 34 and the rods 37, 38 are moved backwards.

A special advantage of the present invention resides in the fact that the brake shoes 14 are automatically returned to an inoperative position upon starting of the automobile without the necessity of moving the car backward and without the necessity of the driver getting out and manually moving the brake shoes.

What is claimed is:

1. In a brake mechanism for motor vehicles, a brake shoe revoluble about the axle of a wheel, adapted to be rotated completely around the wheel solely in the direction of rotation of the wheel, and an eccentric on said axle operable to move said shoe from an inoperative position in which it is spaced from said wheel to an operative position wherein the shoe supports the wheel above the ground and through the latter is in frictional contact therewith.

2. In a brake mechanism for motor vehicles, a brake shoe revoluble completely about the axle of a wheel in the direction of rotation of the wheel, an eccentric on said axle operable to move said shoe from an inoperative position in which it is spaced from said wheel to an operative position wherein the shoe supports the wheel above the ground and, therefore, is in frictional contact therewith, and a latching device engaging said shoe to releasably maintain the same in its inoperative position, said device being operable to release said shoe and being thereafter engageable therewith to retain the same in its operative position.

3. In a brake mechanism for motor vehicles, a brake shoe revoluble about the axle of a wheel, an eccentric on said axle operable to move said shoe from an inoperative position in which it is spaced from said wheel to an operative position wherein the shoe supports the wheel above the ground and is in frictional contact therewith, a latching device engaging said shoe to releasably maintain the same in its inoperative position, said device being operable to release said shoe and being thereafter engageable therewith to retain the same in its operative position, and said device being further operable to allow the rotation of said wheel, by its frictional contact with said shoe, to restore the latter to its inoperative position.

4. In a brake mechanism for motor vehicles, a brake shoe revoluble about the axle of a wheel and including a pair of spaced abutments and a channel adjacent one of said abutments, an eccentric on said axle about which said shoe has a rotative movement from an inoperative to an operative position relative to said wheel, and a latching device engageable with one of said abutments to retain said shoe in its inoperative position, said device also engaging the other abutment to hold the shoe in its operative position, and being movable into alignment with said channel to permit said shoe to be restored to its inoperative position.

5. In a brake mechanism for motor vehicles, a ground engaging brake shoe consisting of a readily exchangeable material such as leather, sheet metal and fabric, that has a smooth inner surface permitting the wheel with which said brake shoe is associated to turn freely when the shoe is in braking position and means for pressing said brake shoe against the wheel only when going out of the braking position so that while in braking position no pressure of the brake shoe is exerted upon the wheel which is additional to that exerted by the weight of the vehicle.

6. In a brake mechanism for motor vehicles, a brake shoe secured on a hub portion that is mounted for movement around the axle of the wheel with which it is associated, said hub portion comprising means for holding that hub portion in braking position and in inactive position and control mechanisms associated therewith for enabling the vehicle driver to place said hub portion and consequently also the brake shoe into operative position and also to render said shoe inactive while the vehicle moves and while it stands still, leaving said shoe free from any parts of the control mechanism.

7. In a brake mechanism for motor vehicles, a brake shoe movable about the axle of a wheel to an operative position through gravity and then through the rolling of said wheel upon the shoe in which operative position, the wheel is capable of rotative movement relative to said shoe, a hub portion associated with said shoe having two shoulders both successively engageable by a means that is controllable from the driver's place on the vehicle, one of said shoulders so arranged as to hold that brake shoe in the inoperative position and the other shoulder so arranged as to hold the brake shoe in the active position when the respective shoulder is engaged by said means.

8. In a brake mechanism for motor vehicles, a brake shoe movable about the axle of a wheel to an operative position in frictional contact with said wheel in which position the latter is capable of free rotative movement relative to said shoe, a stable eccentric device mounted on a stable part that is in connection with the revolvable axle of the wheel, a hub portion to which said shoe is secured and having an eccentric ring so arranged that the inner surface thereof engages parts of the outer edge of said stable eccentric device, said stable eccentric device so arranged that it pulls said hub portion together with said shoe in the direction towards the axle of the wheel when said shoe moves out of the operative position, no pressure of the brake shoe upon the wheel is caused by said eccentric nor by any other device that is additional to the pressure caused by the weight of the vehicle when said brake shoe is in operative position.

9. In a brake mechanism for motor vehicles, a brake shoe movable about the axle of a wheel to an operative position in frictional contact with said wheel, a stable eccentric device, a hub portion with a ring, the latter engaging the eccentric device, said stable eccentric device so arranged that it pulls said hub portion to which said shoe is affixed towards the axle of said wheel and consequently pulls said shoe against the wheel when said shoe goes out of the operative position and while it is carried towards the inoperative position.

10. In a motor vehicle, a brake mechanism including a shoe movable by gravity from an inoperative to an operative position, a hub portion to which said shoe is secured, said hub portion including means engageable by a latching device for holding said shoe in the inoperative and in the operative position, thus leaving the shoe itself free from operating mechanisms, and an operating rod for said latching device.

11. In a brake mechanism for motor vehicles, a brake shoe mounted for movement around the axle of a wheel with which it is associated, a means arranged for pulling said brake shoe against the tires of the wheel when it has moved out of the braking position and is ready to be carried to the inoperative position, said means maintaining said pull upon said shoe until the latter arrives at a part on top of the wheel in which said shoe can move to the inoperative position by gravity.

12. In a brake mechanism for motor vehicles, a brake shoe mounted for movement around the axle of a wheel with which it is associated, a means pulling said brake shoe against the tire of the wheel only when that brake shoe has moved out of the operative active position and said means diminishing said pull upon the brake shoe the nearer the latter comes to the inoperative rest position whereby the impetus imposed upon said shoe by the movement of the wheel replaces then the pull first exerted upon the shoe against the tire.

13. In a brake mechanism for motor vehicles, a stable eccentric device secured to a stable part that is in connection with the axle of a pair of wheels of the vehicle and placed so as to protrude from that stable part chiefly to the front side of a vertical line drawn through the center of the wheel axle, a ring secured to a hub portion and a brake shoe secured to the latter and arranged for movement around the axle of the wheel, said ring movably engaging with its inner surface the periphery of said stable eccentric and when the brake shoe is situated at the rear side of the wheel said ring being then moved in the direction to the front of the wheel pulling said hub portion and shoe also in that direction thus bringing said brake shoe in pressing contact with the periphery of the wheel, and said stable eccentric device causing said ring and hub portion and shoe to move in the direction to the front of the wheel and consequently causing said brake shoe to move out of contact with the wheel when said brake shoe is in front of the wheel, and operable means for holding the brake shoe in that position.

HEINRICH KARL.